Figure 1:
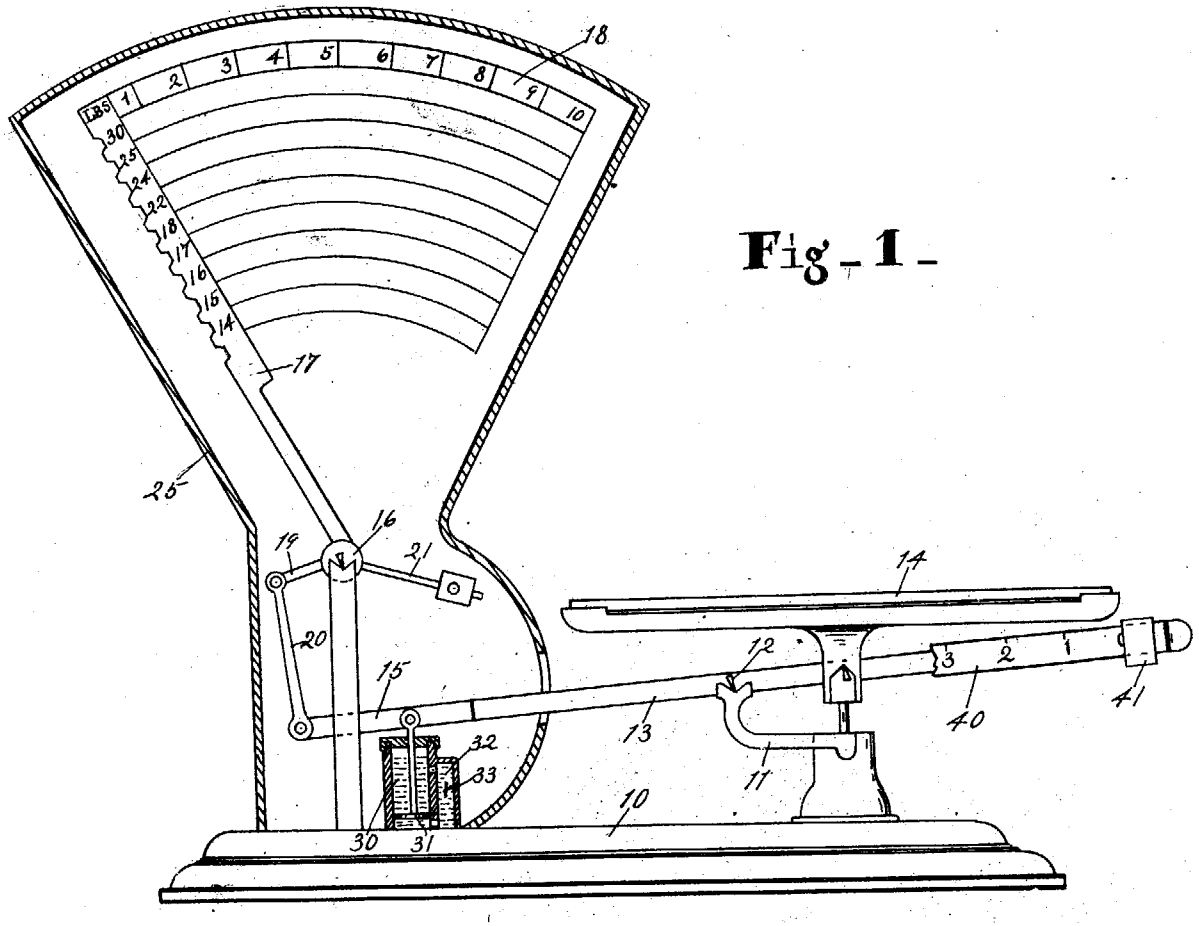

BEST AVAILABLE COPY

F. P. DUNN.

SCALE.

APPLICATION FILED SEPT. 9, 1907.

Reissued Oct. 19, 1915.

13,995.

2 SHEETS—SHEET 1.

WITNESSES:

W. M. Gentle

Olive Breeden

INVENTOR.

Frank P. Dunn.

BY

V. H. Lockwood

ATTORNEY.

BEST AVAILABLE COPY
F. P. DUNN.
SCALE.
APPLICATION FILED SEPT. 9, 1907.
Reissued Oct. 19, 1915.
13,995.
2 SHEETS—SHEET 2.
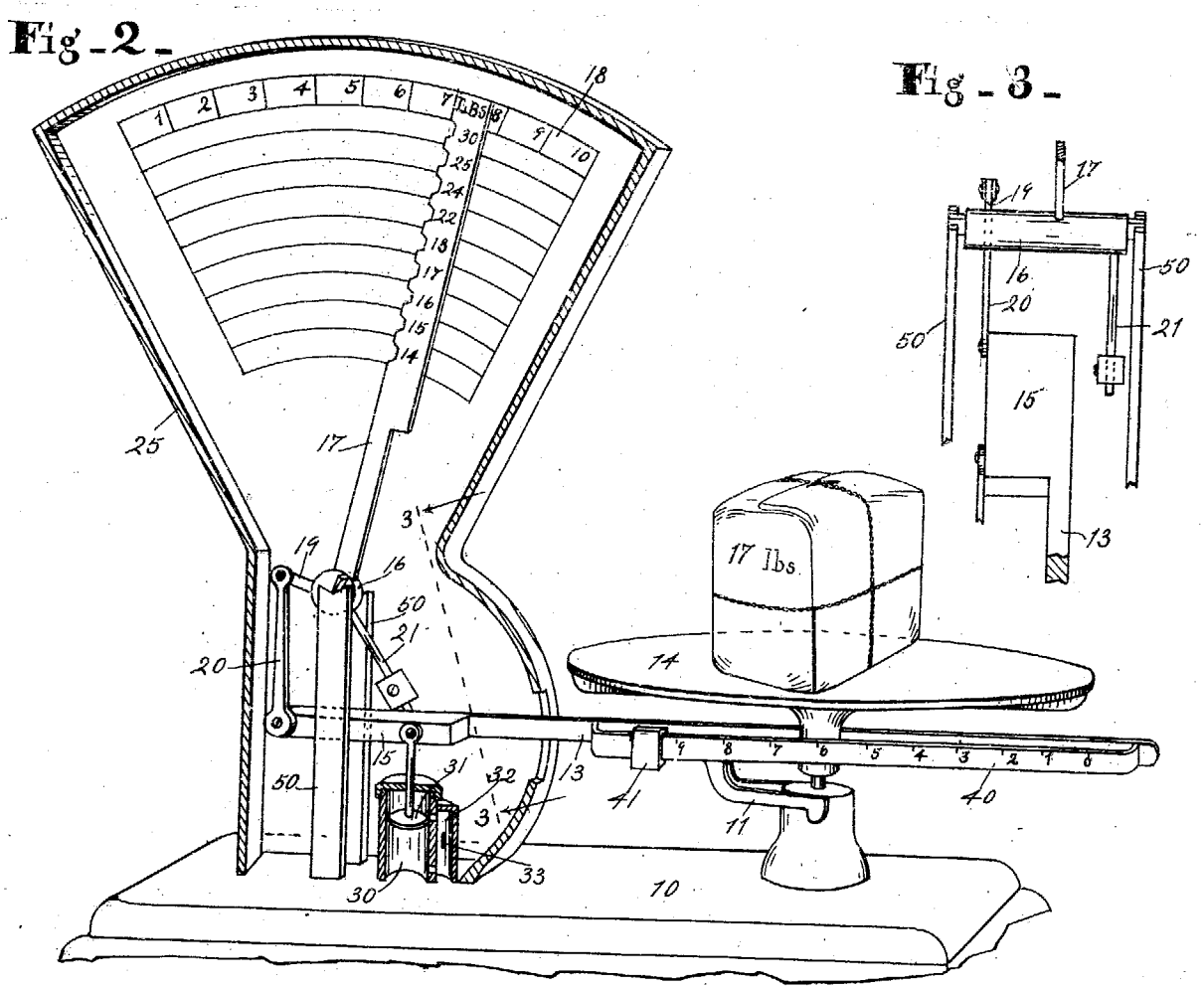
WITNESSES:
W. M. Gentle
Olive Breeden
INVENTOR.
Frank P. Dunn.
BY
V. H. Lockwood
ATTORNEY.

BEST AVAILABLE COPY

UNITED STATES PATENT OFFICE.

FRANK P. DUNN, OF ANDERSON, INDIANA, ASSIGNOR, BY MESNE ASSIGNMENTS, TO THE COMPUTING SCALE COMPANY, OF DAYTON, OHIO, A CORPORATION.

SCALE.

13,995. Specification of Reissued Letters Patent. Reissued Oct. 19, 1915.

Original No. 856,998, dated June 11, 1907, Serial No. 344,018. Application for reissue filed September 9, 1907. Serial No. 392,078.

*To all whom it may concern:*

Be it known that I, FRANK P. DUNN, a citizen of the United States, residing at Anderson, in the county of Madison and State of Indiana, have invented certain new and useful Improvements in Scales, of which the following is a specification.

The object of my invention is to produce an automatically operating scale in which the parts come to balance under different loads by reason of the automatic movement of a weight varying in its effect upon the scale beam inversely as the load is applied. To that end the scale beam is preferably fulcrumed between its ends and carries a load receiving member on one end and a normally overbalancing weight acts constantly and uniformly upon the other end of said beam so as to weight said end of the beam normally in a downward position and hold the load receiving member normally in an upward position, and combined with the foregoing there is a variable weight which acts upon the beam in opposition to the weighted end thereof and in concert with the load receiving member and the load, and under the influence of an applied load varies its influence upon the beam, the force thereof diminishing with the increase of the load, and it is preferably so arranged that its movements are in substantially the same directions as the movements of the load receiving member.

In carrying out my said invention, another feature thereof consists in providing said variable weight in the form of a weighted pendulum which is connected with the beam in such manner that under the influence of an applied load it tends to move toward a vertical position and thus diminish its effect on the beam as the load increases.

Another feature of the invention is in combining said pendulum weight with an indicator so that the indicator will be actuated by the pendulum weight when and to the extent that it is permitted by the movement of the beam as the load is applied.

I do not wish to limit my invention to the details of construction, and the general nature thereof will be understood from the accompanying drawings and the following description and claims.

In the drawings, Figure 1 is a side elevation of said scale with a part broken away and the casing and dash-pot in vertical central section, showing the scale at zero. Fig. 2 is a perspective view of what is shown in Fig. 1 with the tare beam broken away, and with a seventeen pound package on the platform, and the parts of the scale at their proper positions for weighing seventeen pounds. Fig. 3 is a section on the line 3—3 of Fig. 2, showing the parts in perspective and parts broken away and the dash-pot omitted.

In the drawings 10 indicates a suitable base having a casing 25 and a fulcrum standard 11 provided with suitable knife edges 12 upon which the main beam 13 is fulcrumed, said main beam carrying the load receiving platform 14 on its shorter arm. The beam 13 near its inner end is weighted at 15 so as to overbalance the load receiving end.

Upon uprights 50 by suitable knife edges above the inner end of the beam 13, there is a shaft 16 which carries an indicator 17 adapted to traverse the usual graduated chart or computing scale 18. The shaft 16 also carries an arm 19 which normally inclines downwardly and this arm is connected with the weighted end of the beam 13 by means of a link 20, suitable knife edge connections being made between the link, beam 13, an arm 19, in a well known manner. Extending from shaft 16 in opposition to the arm 19 there is an arm 21 which carries an adjustable balance weight 22 and which constitutes a pendulum weight. The normal position of the arm 21 is swung from the vertical, so that weight 22 is normally in an unstable position, having a continuous tendency to fall or move to a vertical position. Weight 22 and the weighted end 15 of the beam 13 are so proportioned that, with the parts in the positions shown in the drawing, a weight of, say ten pounds, upon the platform 14 is necessary to bring the beam to balance at the limit of its weighing movement, with the weight 22 in its vertical and most stable position, that is, directly beneath the shaft 16. The weight 15 also bears such relation to weight 22 that when said weight 22 is in its maximum position, and, therefore exerting its maximum turning force upon said shaft and its maximum lift upon the beam 13, the scale will be in balance with the indicator 17 at zero or the initial end of the computing scale.

BEST AVAILABLE COPY

If now a weight of less than ten pounds be put upon the platform, the pendulum 22 and the load upon the platform counterbalance the weighted end of the beam and the pendulum weight descends until it reaches a position where its effective lift upon the scale beam has decreased a sufficient amount to bring the parts to a balance. It will be noticed, therefore, that the pendulum weight 22 is initially in a position to move in a direction affecting the scale beam in the same way that the applied load affects the scale beam and to coöperate with the load so that as the applied load affects the scale beam, the pendulum weight gradually decreases in effect upon the scale beam until the parts come to a balance. The added load therefore, causes or permits a movement of the pendulum weight in the direction in which gravity continually tends to move it. The scale is, therefore, exceedingly sensitive.

In order to check oscillations of the indicator arm, I provide a novel dash-pot for the scale beam. The dash-pot consists of the main cylindrical chamber 30 in which is reciprocably mounted a piston 31 hung from the scale beam 13. The upper and lower ends of the dash-pot 30 are connected by a passage 32 in which is mounted a valve 33 which serves to adjust the by-pass opening and thus control the flow of fluid from one side of the piston to the other. A convenient form of valve is that shown in the drawing where the valve stem is threaded into the casing but at its inner end is formed into a flat plate which, by a quarter turn of the screw, may be turned from maximum opening so as to lie across the by-pass to entirely close the same.

As is usual with scales of this character, the beam 13 may be provided with a suitable tare beam 40 having a proper tare weight 41 adjustable thereon.

In the actual operation of this scale it is observed that the indicator may be actuated exclusively by the pendulum, as its tendency is to actuate the indicator, while the tendency of the weighted end of the scale beam is to prevent the actuation of the indicator, although with a connection of the sort shown herein, the upward movement of the weighted end of the scale beam under the influence of an applied load, will move and actuate the indicator. Also, the weight on the end of the beam is *per se* constant while the influence of the pendulum weight is variable. But since the pendulum weight tends to reduce the effect of the weighted end of the beam on the action of the beam to a varying degree according to the extent of movement of the pendulum weight, the weight on the end of the beam and the weighted pendulum may be considered as a single weight influence—equal to the weight on the beam minus the effect of the pendulum weight—which diminishes in proportion to the increase of the load and thus enables the load to raise the weighted end of the beam and cause it to actuate or permit the actuating movement by the pendulum of the indicator in proportion to the weight of the load.

I claim as my invention—

1. A weighing scale including a scale beam, a load receiving member carried thereby, a weight, a connection between said weight and scale beam whereby said weight acts upon said beam with a force varying inversely with the variations of the load, stationary means independent of the beam for carrying said weight, and means for indicating the effect of an applied load.

2. A weighing scale including a scale beam fulcrumed between its ends and adapted to receive a load at one end thereof and the other end normally overweighted, a weight, a connection between said weight and scale beam whereby said weight acts upon said beam with a force that varies inversely with the variation of the load, stationary means independent of the beam for carrying said weight, and means for indicating the effect of an applied load.

3. In a scale, the combination with a scale beam, a load receiving member carried thereby, and means for indicating the effect of an applied load, of a weight rigidly connected with the indicating means and which tends to move the indicating means from zero.

4. In a scale, the combination of an oscillatory indicator, a pendulum weight rigidly connected therewith for giving the same a forward movement and which is in a raised position when the indicator is at zero, a load influenced beam, and a connection between said weight and beam whereby they normally hold said indicator at zero and the actuating weight in a raised position when there is no load.

5. A weighing scale including a scale beam fulcrumed between its ends and adapted to receive a load at one end thereof and the other end weighted so that said latter end of the beam will be normally depressed, an oscillatory pendulum weight, stationary means independent of the beam for supporting said pendulum weight, and a connection between said pendulum weight and the weight on said beam.

6. A weighing scale including a scale beam fulcrumed between its ends and adapted to receive a load at one end thereof and the other end weighted so that said latter end of the beam will be normally depressed, an oscillatory indicator actuated by said pendulum weight, stationary means independent of the beam for supporting said pendulum weight and indicator, and a connection between said pendulum weight and indicator and the weighted end of the beam.

EST AVAILABLE COP'

7. In a scale, an oscillatory indicator including an oscillatory indicating bar which at zero is to the left of a vertical line through its fulcrum, a pendulum weight secured thereto near its fulcrum and projecting therefrom to the other side of said vertical line when the indicator is at zero, and a load influenced means for holding said indicator at the zero position and as the load increases permitting said weight to actuate the indicator with a force varying inversely with the load.

8. A weighing scale including a housing, a beam fulcrumed between its ends with one end projecting into the housing, a load receiving member carried on the outer end of the beam and the inner end of the beam being weighted so as to normally overbalance the load receiving member, an indicating chart mounted in the housing, an indicator mounted in the housing and movable across said chart, a connection in the housing between the indicator and the weighted end of the lever and a variably weighted means in the housing and connected with said frame and indicator for controlling the action of the indicator as the load is applied.

9. In a scale, the combination with a pivoted beam adapted to receive a load on one end and having a normally weighted opposite end to oppose an applied load, of a rock shaft, an arm carried by said shaft and connected to the scale beam, an arm carried by said shaft in a normally raised position, a weight on said arm to act upon the scale beam in the direction of the applied load, an indicator scale, and an arm carried by the rock shaft and traversing the scale.

10. In a scale, the combination with a pivoted beam adapted to receive a load on one end and having a normally weighted opposite end to oppose an applied load, of a weight normally in a raised position, a connection between said weight and the scale beam whereby said weight will act upon the scale beam in the direction of the applied load with a variable force as the weight approaches or recedes from its normal position, a dash pot having a passage forming a connection between its ends, a rotatable valve mounted in said passage and having a portion adapted to lie parallel with the passage or transversely across the same, and a piston mounted in the dash pot and connected with the scale beam.

11. In a scale, the combination with a pivoted beam adapted to receive a load on one end and having a normally weighted opposite end to oppose an applied load, of a weight normally in a raised position, a connection between said weight and the scale beam whereby said weight will act upon the scale beam in the direction of the applied load with a variable force diminishing as the weight approaches a lower position, a dash pot having a passage forming a connection between its ends, a rotatable valve mounted in said passage and having a portion adapted to lie parallel with the passage or transversely across the same, and a piston mounted in the dash pot and connected with the scale beam.

12. In a scale, the combination with a pivoted beam adapted to receive a load on one end and having a normally weighted opposite end to oppose an applied load, of a weight normally in a raised position, a connection between said weight and the scale beam whereby said weight will act upon the scale beam in the direction of applied load with a variable force as the weight approaches a lower position, an indicator scale, an indicator connected with the scale beam to move therewith and traverse the scale, a dash pot having a passage forming a connection between its ends, a rotatable valve mounted in said passage and having a portion adapted to lie parallel with the passage or transversely across the same, and a piston mounted in the dash pot and connected with the scale beam.

13. In a scale, the combination with a pivoted beam adapted to receive a load on one end and having a normally weighted opposite end to oppose an applied load, of a rock shaft, an arm carried by said shaft and connected to the scale beam, an arm carried by said shaft in a normally raised position, a weight on said arm to act upon the scale beam in the direction of the applied load, a dash pot having a passage forming a connection between its ends, a rotatable valve mounted in said passage and having a portion adapted to lie parallel with the passage or transversely across the same, and a piston mounted in the dash pot and connected with the scale beam.

14. In a scale, the combination with a pivoted beam adapted to receive a load on one end and having a normally weighted opposite end to oppose an applied load, of a rock shaft, an arm carried by said shaft and connected to the scale beam, an arm carried by said shaft in a normally raised position, a weight on said arm to act upon the scale beam in the direction of the applied load, an indicator scale, an arm carried by the rock shaft and traversing the scale, a dash pot having a passage forming a connection between its ends, a rotatable valve mounted in said passage and having a portion adapted to lie parallel or transversely across the same, and a piston mounted in the dash pot and connected with the scale beam.

15. In a scale, the combination with a pivoted beam adapted to receive a load on one end and having a normally weighted opposite end to oppose an applied load, of a rotative indicator support, an indicator, a

BEST AVAILABLE COPY scale traversed by said indicator, a connection between the indicator support and the scale beam, an arm carried by said indicator support in a normally raised position, a weight on said arm to act upon the scale beam in the direction of the applied load, and means connected to said scale connected to one of the movable parts of said structure to regulate the vibration of the beam.

16. In weighing scales, the combination of a beam fulcrumed intermediate its ends, a goods receiver carried by the beam on one side of the latter's fulcrum, a pendulum, fixed bearings from which the latter is wholly suspended, and a connection between the pendulum and the beam on the side of the latter's fulcrum opposite that where the goods receiver is located, the beam preponderating in weight on the side where the pendulum is connected, normally holding the latter and the goods receiver elevated, the pendulum being adapted to descend with the applied load until equilibrium is attained.

17. In weighing scales, the combination of a beam fulcrumed intermediate its ends and having a short arm on one side of the fulcrum and a long arm on the other side of the fulcrum, a goods receiver supported by the short arm, a pendulum, fixed bearings from which the latter is wholly suspended, and a connection between the pendulum and the long arm of the beam such arm preponderating in weight normally elevating the pendulum and the goods receiver, the pendulum being adapted to descend with the applied load until equilibrium is attained.

18. In weighing scales, the combination of a beam fulcrumed intermediate its ends, a goods receiver carried by the beam on one side of the latter's fulcrum, a pendulum, fixed bearings from which the latter is wholly suspended, a fixed plate bearing a table of weights, an index associated therewith and secured to the pendulum, and a connection between the pendulum and the beam on the side of the latter's fulcrum opposite that where the goods receiver is located, the beam preponderating in weight on the side where the pendulum is connected normally holding the latter and the goods receiver elevated, the pendulum being adapted to descend with the applied load until equilibrium is attained.

19. In weighing scales, the combination of a beam fulcrumed intermediate its ends and having a short arm on one side of the fulcrum and a long arm on the other side of the fulcrum, a goods receiver supported by the short arm, a pendulum, fixed bearings from which the latter is wholly suspended, a fixed plate bearing a table of weights, an index associated therewith and secured to the pendulum, and a connection between the pendulum and the long arm of the beam, such arm preponderating in weight, normally elevating the pendulum and the goods receiver, the pendulum being adapted to descend with the applied load until equilibrium is attained.

20. In weighing scales, the combination of a beam fulcrumed intermediate its ends, a goods receiver carried by the beam on one side of the latter's fulcrum, a pendulum and journal with a crank arm, fixed bearings for said journal from which the pendulum is wholly suspended, and a link connecting said crank arm with the beam on the side of the latter's fulcrum opposite that where the goods receiver is mounted, the beam preponderating in weight on the side where the link is connected and normally elevating the pendulum and the goods receiver, the pendulum being adapted to descend with the applied load until equilibrium is attained.

21. In weighing scales, the combination of a beam fulcrumed intermediate its ends and having a short arm on one side of the fulcrum and a long arm on the other side of the fulcrum, a goods receiver supported by the short arm, a pendulum and journal with a crank arm, fixed bearings for said journal and from which the pendulum is wholly suspended, and a link connecting said crank arm with the long arm of the beam, such arm preponderating in weight normally elevating the pendulum and the goods receiver, the pendulum being adapted to descend with the applied load until equilibrium is attained.

22. In weighing scales, the combination of a beam fulcrumed intermediate its ends, a goods receiver carried by the beam on one side of the latter's fulcrum, a pendulum and journal with a crank arm, fixed bearings for said journal, a fixed plate bearing a table of weights, an index associated therewith and secured to the pendulum, and a link connecting said crank arm with the beam on the side of the latter's fulcrum opposite that where the goods receiver is mounted, the beam preponderating in weight on the side where the link is connected normally elevating the pendulum and the goods receiver, the pendulum being adapted to descend with the applied load until equilibrium is attained.

23. In weighing scales, the combination of a beam fulcrumed intermediate its ends and having a short arm on one side of the fulcrum and a long arm on the other side of the fulcrum, a goods receiver supported by the short arm, a pendulum and journal with a crank arm, fixed bearings for said journal from which the pendulum is wholly suspended, a fixed plate bearing a table of weights, an index associated therewith and secured to the pendulum, and a link connect-

BEST AVAILABLE COPY ing said crank arm with the long arm of the beam, such arm preponderating in weight and normally elevating the pendulum and the goods receiver, the pendulum being adapted to descend with the applied load until equilibrium is attained.

24. In a weighing scale, the combination with a main beam or lever, a goods receiver carried thereby to one side of its pivot or fulcrum, a counter-balance member comprising a pendulum and its journal, and a positively operating connection attached to said member eccentrically with respect to its journal, and applied to the beam on the side of the latter's pivot or fulcrum opposite that where the goods receiver is located, the beam on such side preponderating in weight to normally uphold the goods receiver and normally elevate the pendulum through the positive connection aforesaid and the pendulum being adapted to descend with the applied load until equilibrium is attained.

25. In a weighing scale, the combination with a main beam or lever, a goods receiver carried thereby to one side of its pivot or fulcrum, a pendulum and its journal, the latter having a crank pin in the form of an upwardly directed knife edge bearing, and a link engaging over such knife edge bearing and being connected to the beam on the side of the latter's fulcrum opposite that where the goods receiver is located, the beam preponderating in weight on that side and normally elevating the pendulum by down draft on the said link, the pendulum being adapted to descend with the applied load until equilibrium is attained.

26. In a weighing scale, the combination with a main beam or lever, a goods receiver carried thereby to one side of the pivot or fulcrum, a counter-balance member comprising a pendulum and its journal, a positively operating connection attached to said member eccentrically with respect to its journal and applied to the beam on the side of the latter's pivot or fulcrum opposite that where the goods receiver is located, the beam on such side preponderating in weight to normally uphold the goods receiver and normally elevate the pendulum through the positive connection aforesaid, and indicating means comprising a fixed member and a member operatively connected to the pendulum, the pendulum being adapted to descend with the applied load until equilibrium is attained.

27. In a weighing scale, the combination with a main beam or lever, a goods receiver carried thereby to one side of its pivot or fulcrum, a counter-balance member comprising a pendulum and its journal, a positively operating connection attached to said member eccentrically with respect to its journal and applied to the beam on the side of the latter's pivot or fulcrum opposite that where the goods receiver is located, the beam on such side preponderating in weight to normally uphold the goods receiver and normally elevate the pendulum through the positive connection aforesaid, a fixed plate bearing a table of weights, and an index hand extending adjacent the same and secured to the pendulum, the pendulum being adapted to descend with the applied load until equilibrium is attained.

In witness whereof, I have hereunto set my hand and seal at Anderson, Indiana, this 14th of August, A. D. one thousand nine hundred and seven.

FRANK P. DUNN.

Witnesses:
B. D. EMANUEL,
LOTTA NEFF.